US012042464B2

(12) United States Patent
Bair et al.

(10) Patent No.: US 12,042,464 B2
(45) Date of Patent: Jul. 23, 2024

(54) CONTINUOUS AND PULSED AIR MASSAGER

(71) Applicant: FLASH Momentum, LLC, West Chester, PA (US)

(72) Inventors: J. Ryan Bair, West Chester, PA (US); Matthew A. Sommerfield, Allentown, PA (US)

(73) Assignee: FLASH Momentum, LLC, West Chester, PA (US)

( * ) Notice: Subject to any disclaimer, the term of this patent is extended or adjusted under 35 U.S.C. 154(b) by 0 days.

(21) Appl. No.: 17/952,231

(22) Filed: Sep. 24, 2022

(65) Prior Publication Data

US 2023/0095688 A1 Mar. 30, 2023

Related U.S. Application Data

(60) Provisional application No. 63/247,825, filed on Sep. 24, 2021.

(51) Int. Cl.
*A61H 9/00* (2006.01)

(52) U.S. Cl.
CPC ......... *A61H 9/0071* (2013.01); *A61H 9/0007* (2013.01); *A61H 2201/0153* (2013.01); *A61H 2201/1238* (2013.01); *A61H 2201/5056* (2013.01)

(58) Field of Classification Search
CPC ............ A61H 9/0071; A61H 2201/025; A61H 9/0078; A61H 9/0007; A61H 2201/0153; A61H 2201/1238; A61H 2201/5056
USPC .................................................. 601/148–152
See application file for complete search history.

(56) References Cited

U.S. PATENT DOCUMENTS

| | | | | |
|---|---|---|---|---|
| 2,739,586 | A | 3/1956 | Preis | |
| 3,163,161 | A * | 12/1964 | Courtin | A61H 9/0071 601/16 |
| 4,428,368 | A | 1/1984 | Torii | |
| 6,786,878 | B2 * | 9/2004 | Dehli | A61H 9/0071 601/16 |
| 7,238,162 | B2 | 7/2007 | Dehli | |
| 10,675,209 | B1 * | 6/2020 | Stroud, Jr. | A61F 7/0085 |
| 2005/0049535 | A1 | 3/2005 | Reinmuller | |

(Continued)

FOREIGN PATENT DOCUMENTS

| | | |
|---|---|---|
| CH | 304547 | 1/1955 |
| CH | 346974 | 6/1960 |

(Continued)

OTHER PUBLICATIONS

Mars, Maurice et al. "The effect of compressed air massage on skin blood flow and temperature" Cardiovasc J.S. Afr. Jul.-Aug. 2005; 16(4):215-9.

*Primary Examiner* — Justine R Yu
*Assistant Examiner* — Matthew R Moon
(74) *Attorney, Agent, or Firm* — Joseph E. Maenner; Maenner & Associates, LLC

(57) ABSTRACT

An air massager includes an air flow generator having an output, a nozzle in fluid communication with the output, and a pulsed air generator located between the output and the nozzle. Operation of the pulsed air generator alternately allows and restricts air flow from the output to the nozzle. A method of operating the massager is also provided.

12 Claims, 9 Drawing Sheets

(56) References Cited

U.S. PATENT DOCUMENTS

| | | | | |
|---|---|---|---|---|
| 2015/0173999 | A1* | 6/2015 | Vanderstegen-Drake | A61H 9/0092 601/151 |
| 2020/0306125 | A1* | 10/2020 | Ono | A61H 7/00 |
| 2022/0133582 | A1* | 5/2022 | Downs | A45D 20/12 601/16 |

FOREIGN PATENT DOCUMENTS

| | | | | |
|---|---|---|---|---|
| CN | 2792450 | | 7/2006 | |
| CN | 106726398 | | 2/2018 | |
| EP | 0266862 | A1 * | 8/1987 | |
| EP | 1059861 | | 4/2002 | |
| EP | 2796124 | | 11/2020 | |
| FR | 2706292 | | 12/1994 | |
| GB | 2270472 | A * | 3/1994 | A61H 9/0078 |
| KR | 2012004378 | | 5/2012 | |
| KR | 101297373 | | 8/2013 | |
| KR | 101600360 | | 3/2016 | |
| WO | WO0189633 | | 11/2001 | |
| WO | WO2004105674 | | 12/2004 | |
| WO | WO2006051414 | | 5/2006 | |
| WO | WO2007003974 | | 1/2007 | |
| WO | WO2007063470 | | 6/2007 | |
| WO | WO2012077882 | | 6/2012 | |
| WO | WO2018101755 | | 6/2018 | |

* cited by examiner

CONTINUOUS AND PULSED AIR MASSAGER

BACKGROUND OF THE INVENTION

Field of the Invention

The invention relates to a continuous and pulsed air massager.

Description of the Related Art

Massage is a well-known method of relieving cramped and achy muscles. Standard massage requires a therapist to manipulate a patient's skin and underlying muscle or muscle group with physical touch, typically with hands, elbows, and forearms. The therapist repeatedly goes over the muscle or muscle group, repeating the massage technique numerous times to massage and relax the tissue to loosen and soothe the muscle or muscle group.

Alternatively, some massage can be performed without physically touching the patient's skin, such as by applying forced air directly to the skin. The forced air is being applied to the skin at a constant or pulsed rate.

It would be beneficial to provide an air massager that provides continuous and pulsed air that can be directed to a muscle, a muscle group, or any other body part to alternately massage and relax the muscle or muscle group being treated.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a continuous and pulsed air massager that includes an air flow generator having an output, a nozzle in fluid communication with the output, and a pulsed air generator located between the output and the nozzle. Operation of the pulsed air generator alternately allows and restricts air flow from the output to the nozzle. A method of operating the massager is also provided.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
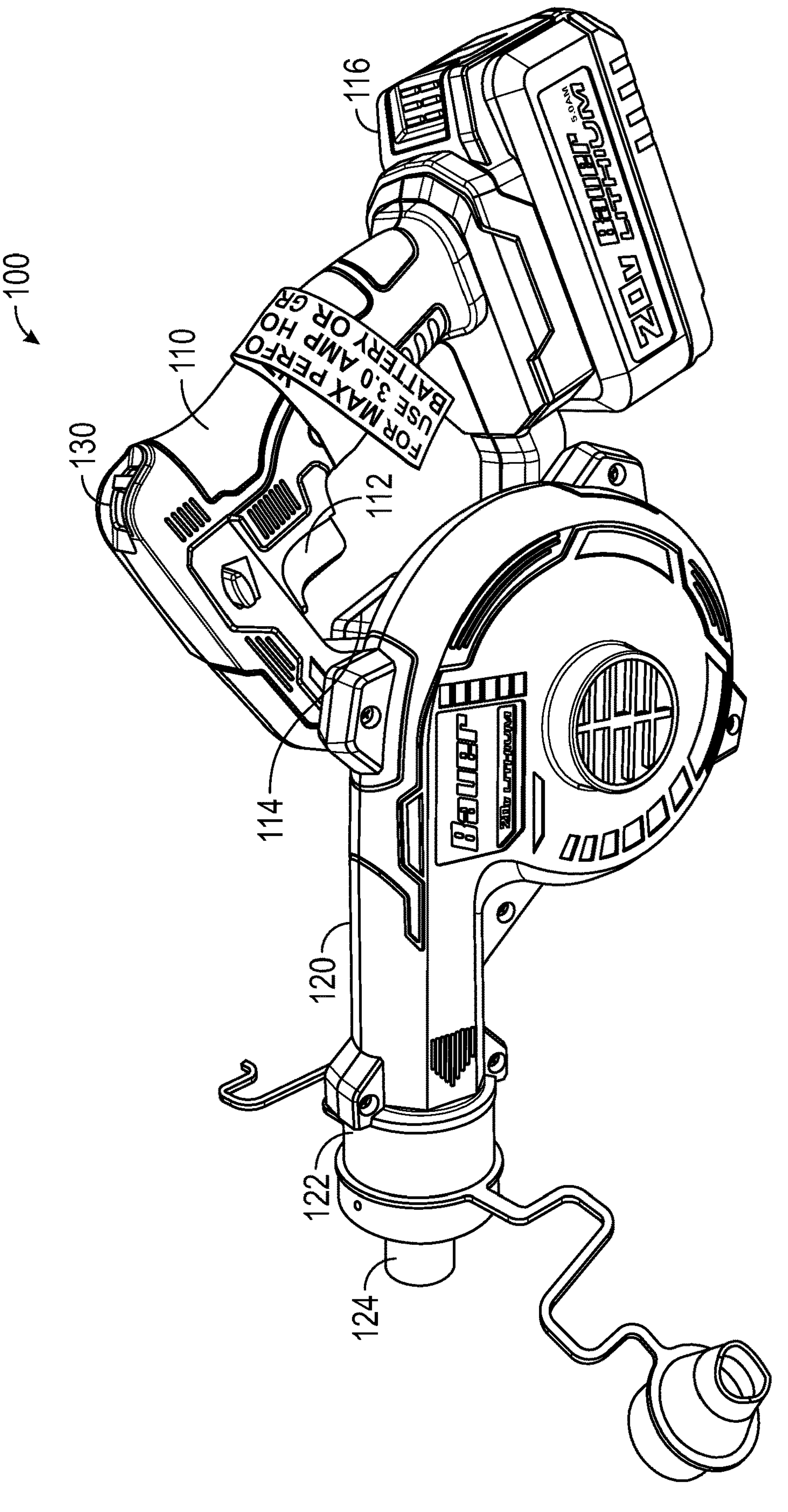
FIG. 1 is a perspective view of a first exemplary embodiment of an air massager according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word “about” is used herein to include a value of +/−10 percent of the numerical value modified by the word “about” and the word “generally” is used herein to mean “without regard to particulars or exceptions.”

Additionally, the term “or” is intended to mean an inclusive “or” rather than an exclusive “or”. That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

Unless explicitly stated otherwise, each numerical value and range should be interpreted as being approximate as if the word “about” or “approximately” preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

A method of using pressurized air directed at a muscle to generate muscle relief is provided. The method uses a machine that directs the pressurized air through a tube with a nozzle at a distal end thereof to impact a person and use the air to massage a muscle or a muscle group. An advantage of the present invention over the prior art is the ability to massage the muscle or muscle group without physically contacting the user’s skin, allowing less damage to skeletal myofibers while still achieving one of the primary benefits of massage, which is an increase in skin blood flow.

An exemplary embodiment of a device 100 that can be used to relieve a muscle is shown in FIG. 1. Device 100 is a hand-held, portable device that includes a handle 110 having a trigger 112. Operation of trigger 112 generates a rotational output at an output end 114. A power source, such as a direct current battery 116, can be attached to handle 110. Alternatively, the power source can be alternating current provided by a power cord (not shown) plugged into an electrical outlet.

Output end 114 is operationally connected to a blower 120. Blower 120 has a blower output 122 having a nozzle 124 connected thereto. Device 100 can includes a speed selector 130 that is selectable among multiple speed settings to generate different rotational output speeds and, as a result, different air flow speeds and pressures from nozzle 124.

In an exemplary embodiment, device 100 weighs less than about four pounds.

A user can use device 100 by selecting a muscle or a muscle group and aiming the output of nozzle 124 at the muscle. In an exemplary method, nozzle 120 is not actually touching the user, but is spaced a short distance from the user, such as, for example, about 1 to 2 inches from the patient.

The user depresses trigger 112, generating pressurized air at a relatively high velocity that impacts the user’s muscle through the skin and massages the muscle without anything but the air touching the user. The user can move nozzle 124 around the muscle so that the air generated by device 100 massages the muscle.

Figure 2:
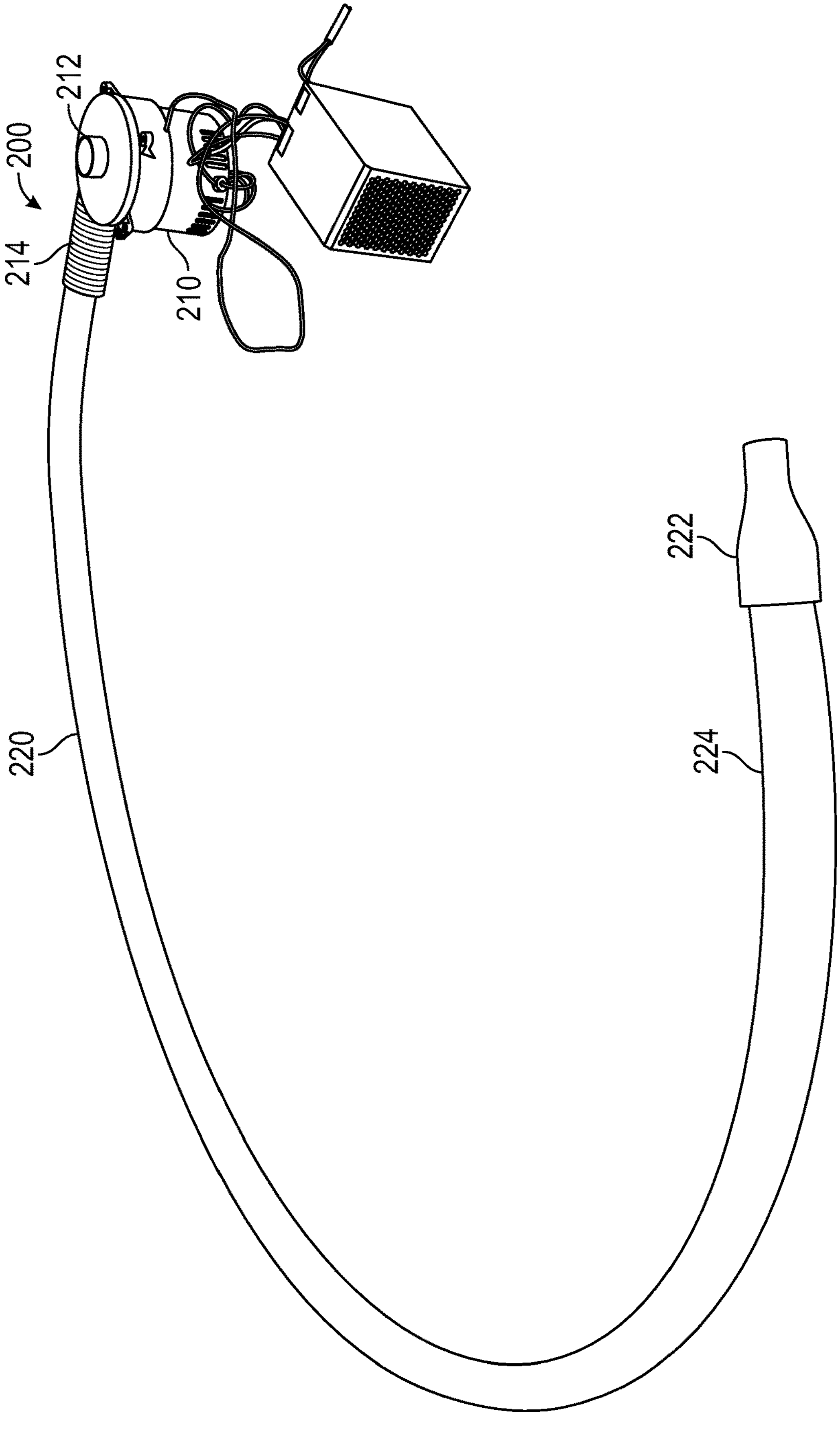
FIG. 2 is a perspective view of a first exemplary embodiment of an air massager according to an alternative exemplary embodiment of the present invention.

An alternative embodiment of a device 200 that can be used to relieve a muscle is shown in FIG. 2. While device 100 is a hand-held device, device 200 can be a table or floor mounted device with a higher capacity for generating air flow at higher speeds and flow rates than hand-held device 100.

Figure 3:
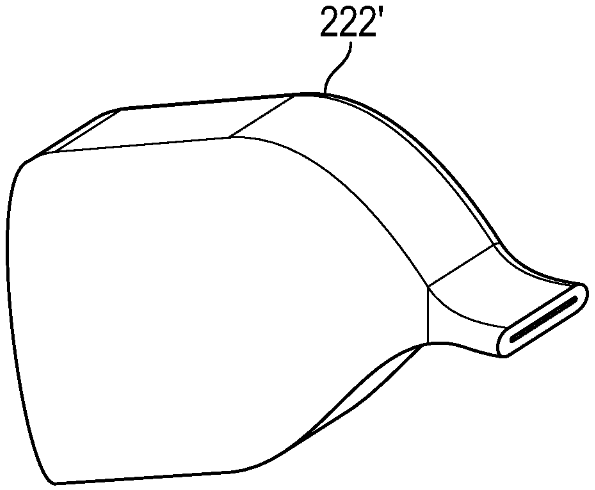
FIG. 3 is a perspective view of an alternative embodiment of a nozzle for use with either of the air massagers of FIG. 1 or 2.

Device 200 includes a blower 210 having an air intake 212 and an air output 214. Air output 214 is connected to an outlet tube 220 having a nozzle 222 attached to a distal end 224 of tube 220. Nozzle 222 can be fixedly attached to distal end 224 of tube 220 or, alternatively, nozzle 222 can be removably attached to distal end 224 of tube 220 and replaced with a different nozzle 222', shown in FIG. 3.

A blower controller 230 is electrically connected to blower 210. Blower controller 230 can be a variable power controller that can be adjusted to vary blower speed and output. In an exemplary embodiment, nozzle 222 can have a 0.86" output diameter and, with blower 210 controlled at a maximum capacity, generate an air speed of 205 mph having a flow rate of 75 cubic feet per minute (CFM). Alternatively, nozzle 222' can have a 0.62" output diameter and, with blower 210 controlled at a maximum capacity, generate an air speed of 240 mph having a flow rate of at least 40 CFM, and desirably, about 45 CFM. The speed and flow rate parameters for nozzles 222, 222' are within desired boundary specifications of 200-400 mph and less than 100 CFM.

Device 200 can be used to massage muscles in the same manner as device 100 described above.

While device 100, 200 use blowers as air movers, those skilled in the art that, instead of blowers, compressors or compressed air in cylinders can be used to generate the desired air flow through nozzles 124, 222.

Figure 4:
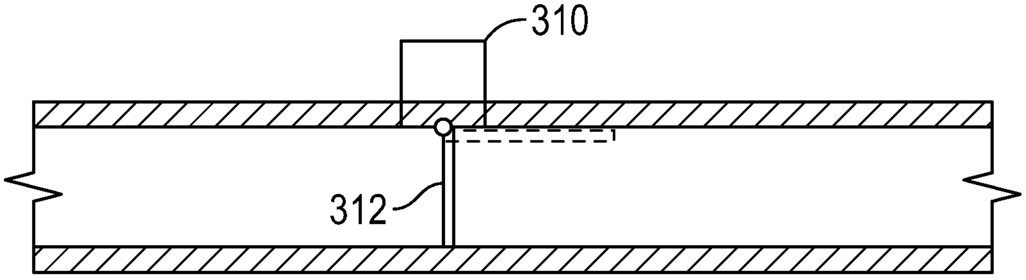
FIG. 4 is a side elevational view, in section, of an exemplary embodiment of a pulsed air generator for use with either of the air massagers of FIG. 1 or 2.
Figure 5:
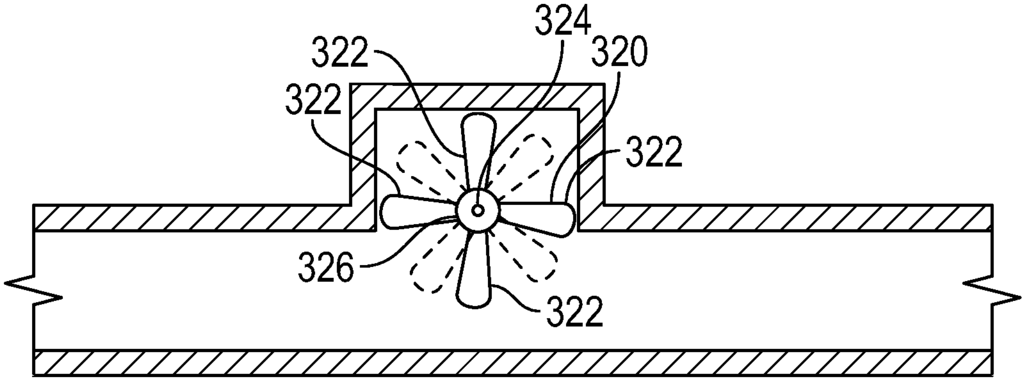
FIG. 5 is a side elevational view, in section, of an alternative exemplary embodiment of a pulsed air generator for use with either of the air massagers of FIG. 1 or 2.

While device 100 and device 200 generate air flow at constant rates, in an alternative embodiment, shown in FIGS. 4 and 5, devices 100, 200 can be modified to generating alternating on/off pulses of air by adding a pulsed air generator. For example, referring to FIG. 4, a solenoid 310 can be located anywhere between device 110/blower 210 and a respective nozzle 124, 222. Solenoid 310 is connected to a flapper 312 that can open and close to allow or restrict air flow, generating pulses of air from nozzle 124, 222. Solenoid 310 can be connected to power source 116 or controller 230 such that, when air is flowing through device 100, 200, solenoid 310 cycles to move flapper 312 between a closed position, shown in solid lines in FIG. 4, and an open position, shown in broken lines in FIG. 4, generating air pulses from nozzles 124, 222. The frequency of operation of solenoid 310 can be adjusted to vary the time period between pulses.

Alternatively, instead of solenoid 310 and flapper 312, as shown in FIG. 5, a rotating vaned wheel 320 can be inserted upstream of nozzle 124, 222. Wheel 320 is powered by the air flowing through device 100, 200 and rotates such that vanes 322 intermittently obstruct and allow air flow through device. When wheel 320 is in the position shown in solid lines, air flow is obstructed and, when wheel 320 is in the position shown in dashed lines, air can flow through device 100, 200, generating pulses from nozzles 124, 222. A brake 324 can be applied to wheel 320 to retard the rotation of wheel 320 to alter the strength and frequency of air pulses generated by the rotation of wheel 320. Brake 324 can be a threaded knob that exerts a frictional retarding force on hob 326 of wheel 320. The tighter that the brake 324 is turned, the slower wheel 320 rotates, generating longer time periods between air pulses.

Figure 6A:
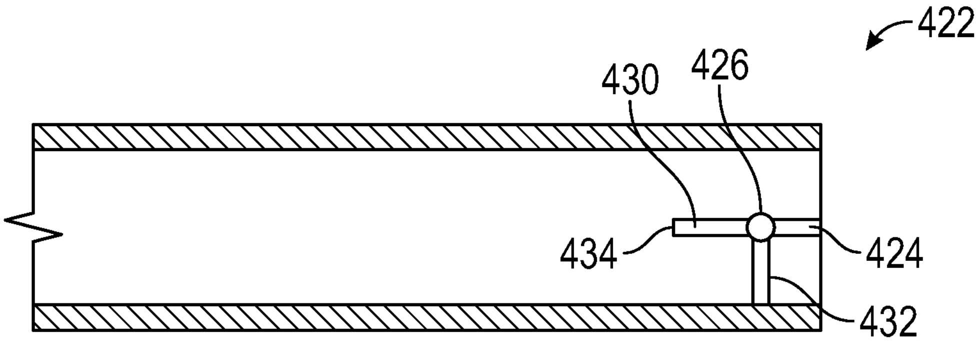
FIG. 6A is a side elevational view, in section, of an alternative embodiment of a pulsed air generator for use with either of the air massagers of FIG. 1 or 2 in a first position.
Figure 6B:
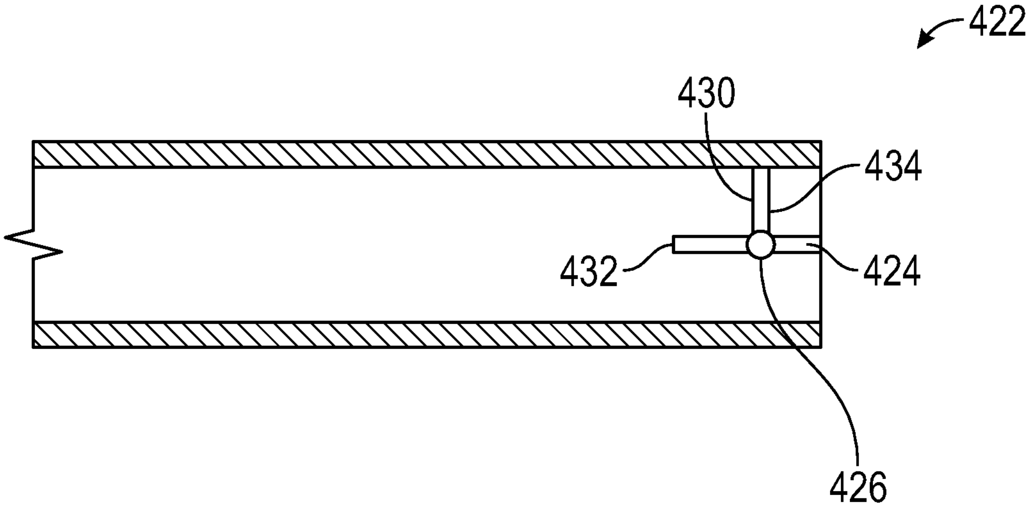
FIG. 6B is a side elevational view, in section, of the pulsed air generator of FIG. 6A in a second position.

Still alternatively, as shown in FIGS. 6A and 6B, a nozzle 422 can be provided. Nozzle 422 has a diametric rib 424 extending across an outlet of nozzle 422. Rib 424 supports a motor 426 that flips a 90 degree gate 430 back and forth between a first position shown in FIG. 6A, wherein a first portion 432 of gate 430 covers a lower end of nozzle 422 while a second portion 434 of gate 430 extends axially along nozzle 422 and a second position, shown in FIG. 6B, wherein second portion 434 of gate 430 covers an upper end of nozzle 422 while first portion 432 of gate 430 extends axially along nozzle 422. The back and forth motion of gate 430 can be adjusted by the user to generate different pulse periods of air from the top and from the bottom of nozzle 422.

While devices 100, 200 are described above as providing pulsed air, those skilled in the art will recognize that the mechanism that generates the pulses of air can be disabled such that air is provided in a continuous fashion, without any pulsing effect.

Figure 7C:
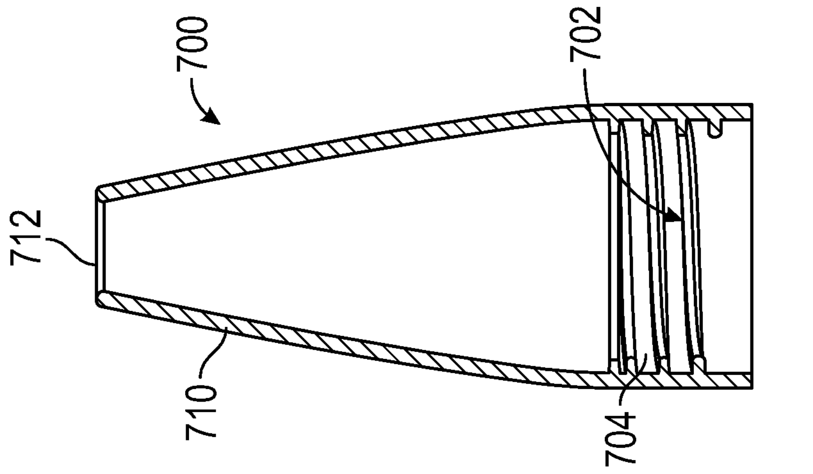
FIG. 7C is a sectional view of the nozzle of FIG. 7B taken along lines 7C-7C of FIG. 7B.
Figure 7B:
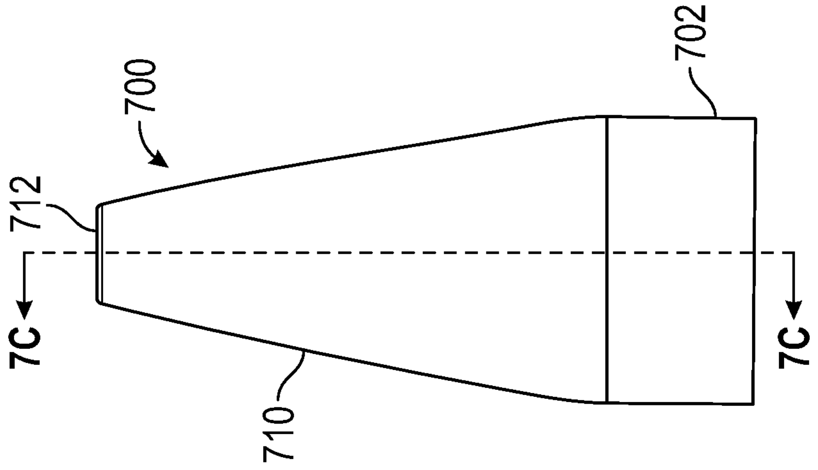
FIG. 7B is a side elevational view of the nozzle of FIG. 7A.
Figure 7A:
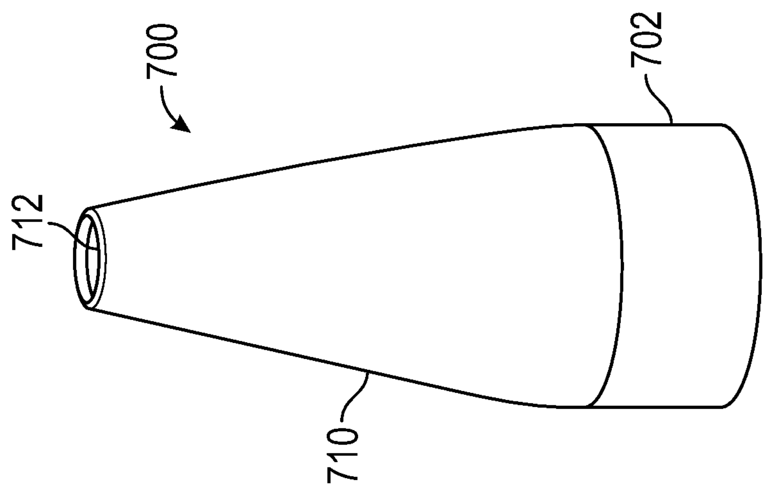
FIG. 7A is a perspective view of an exemplary embodiment of a nozzle used with the air massager of FIG. 1 or 2.
Figure 9B:
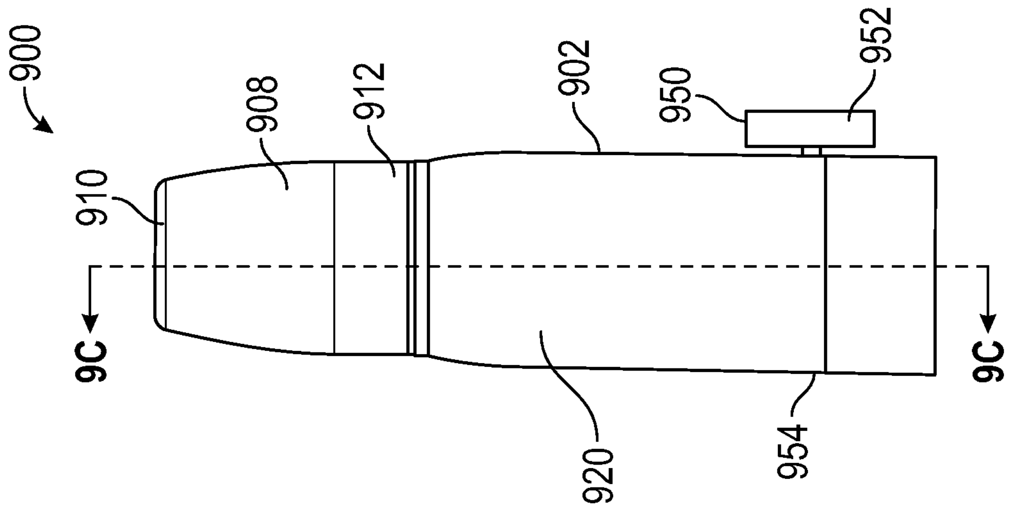
FIG. 9B is a side elevational view of the air generator of FIG. 9A.
Figure 9A:
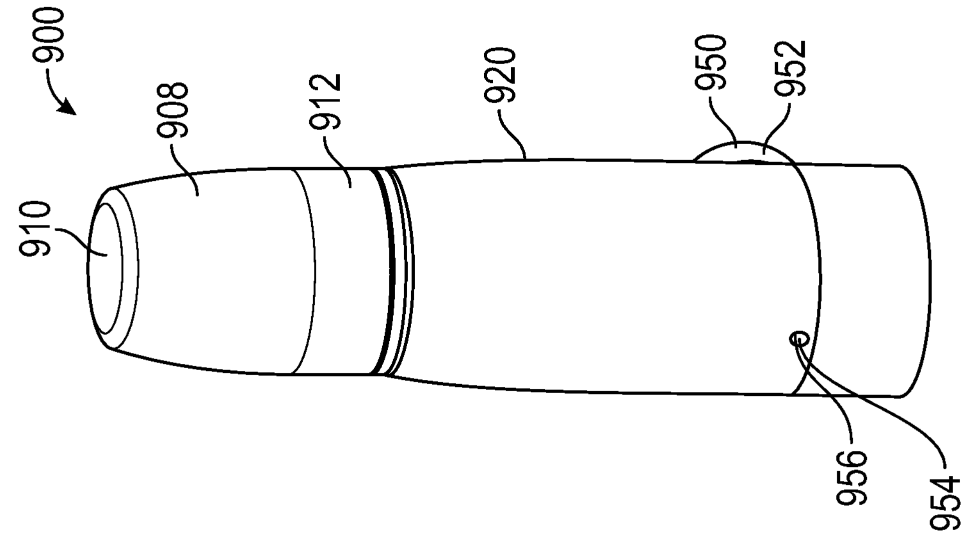
FIG. 9A is perspective view of a non-motor driven pulsing air generator according to an exemplary embodiment of the present invention.

FIGS. 7A-7C show a continuous air nozzle 700 that can be used with either of device 100, 200. Instead of nozzle 124 or nozzle 222, shown in FIGS. 1 and 2, respectively, nozzle 700 can be attached to blower output 122 or tube 220.

Nozzle 700 includes a cylindrical threaded proximal end 702 with female threads 704 that allow nozzle 700 to be threaded onto a male threaded output (not shown). Distal end 710 of nozzle is conically tapered, with an output opening 712. In an exemplary embodiment, output opening 712 is at least 30 percent the size of proximal end 702.

Nozzle 702 does not provide any pulsing ability, but instead increases the speed of air flowing therethrough due to the reduced area of output opening 712 compared to the opening at proximal end 702. It is envisioned that different sized nozzles 700 can be used with different sized outlet openings 712 to generate differing exit air velocities and air distribution patterns as desired.

Referring to FIGS. 8A-8D, a motor powered pulsing air discharger 800 is provided. Air discharger 800 is powered by an electric motor 802 that can be battery powered, an electric plug-in, or other suitable device to rotate motor 802. Motor 802 can be variable speed depending on the desired application. An output 804 of motor 802 drives a pulley wheel 806 that drives a continuous belt 808.

Figure 8B:
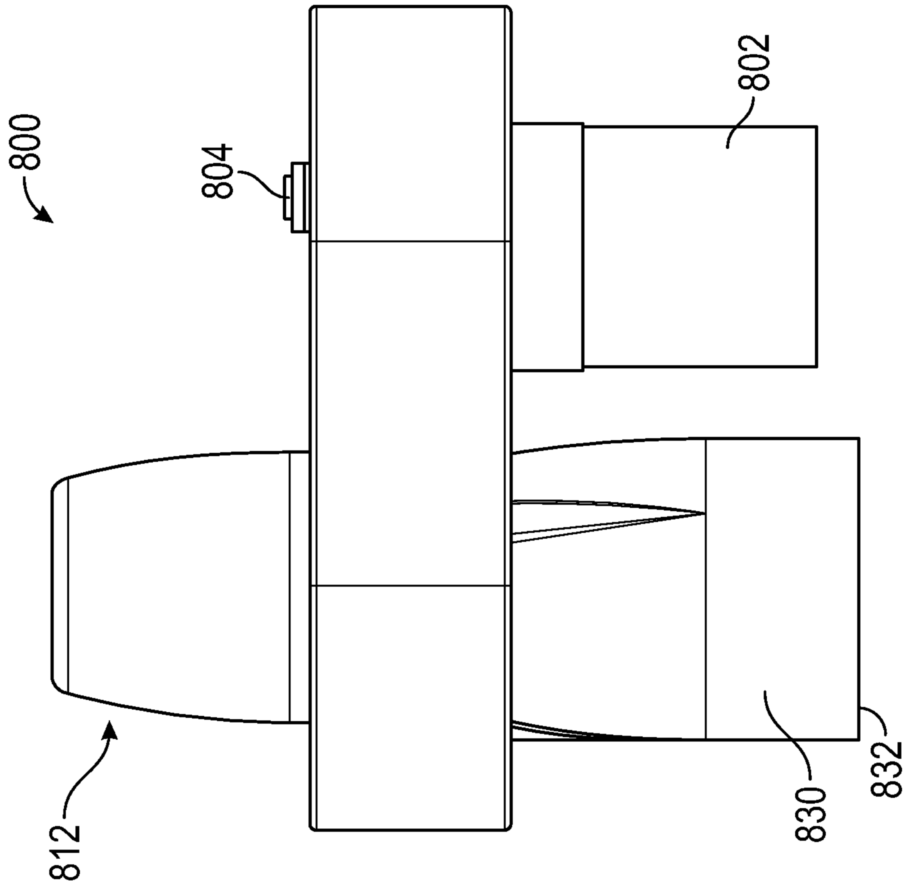
FIG. 8B is a side elevational view of the air generator of FIG. 8A.
Figure 8A:
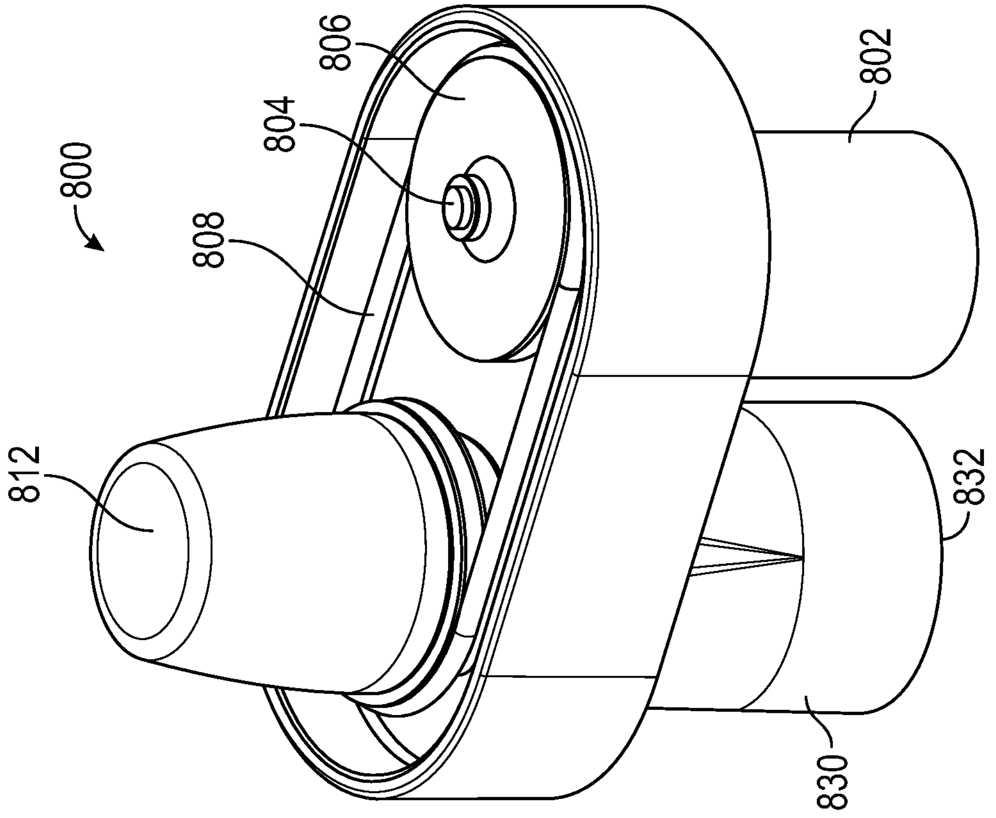
FIG. 8A is a perspective view of an exemplary embodiment of a motor driven pulsing air generator according to an exemplary embodiment of the present invention.
Figure 8C:
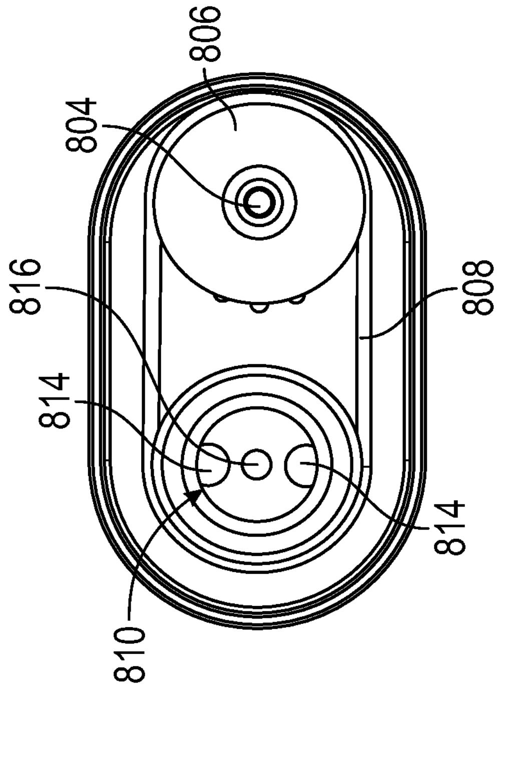
FIG. 8C is a top plan view of the air generator of FIG. 8A, with the nozzle removed.

Belt 808 drives a rotor 810 in a rotating nozzle 812. Rotor 810 has a first number of apertures 814 formed therein. In an exemplary embodiment, as shown in FIG. 8C, two apertures 814 are provided. Rotor 810 is rotatingly mounted on an axle 816. Nozzle 812 can be omitted while still allowing discharger 800 to operate.

Figure 8D:
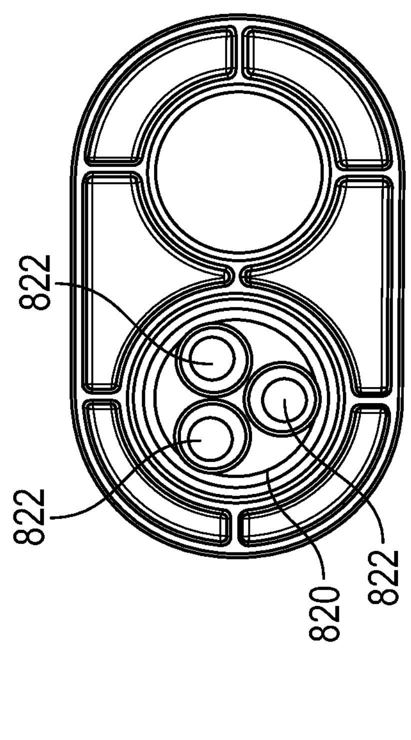
FIG. 8D is a top plan view of the air generator of FIG. 8C, with the rotating plate and motor removed.

A stator plate 820 located vertically below rotor 810 has a second number of apertures 822 formed therein, different from the first number of apertures 814. In the embodiment shown in FIG. 8D, three apertures 822 are shown, although those skilled in the art will recognize that more or less than two apertures 814 and more or less than three apertures 822 can be provided, although it is desired that the first number of apertures 814 is not the same value as the second number of apertures 822. This unequal amount of apertures 814, 822 results in a pulsing air effect as air flows first through the fixed apertures 822 in stator plate 820 and then through the apertures 814 as rotor 810 rotates about axle 816. By way of example only and as shown in FIGS. 8C and 8D, apertures 814 are spaced 180 degrees apart from each other and apertures 822 are spaced 120 degrees apart from each other. As a result, when one of the first number of apertures is aligned with one of the second number of apertures, none of the remaining first numbers of apertures are aligned with any of the remaining second number of apertures, generating air pulses.

An air inlet 830 beneath stator 820 can have a proximal end 832 that attaches to an air supply hose (not shown) to provide air to air discharger 800. The air flows through proximal end 832 or air inlet 830, to stator 820, where the air is forced through apertures 822, then through rotating rotor 810, where the air now pulses due to the rotation of rotor 810 and the unequal number of apertures 814 compared to the number of apertures 822, then out optional nozzle 812 as nozzle 812 rotates, providing pulsed air out of nozzle 812.

Referring to FIGS. 9A-9F, a non-motor powered pulsing air discharger 900 is provided. Air discharger 900 is powered by an air turbine 940 mounted in air discharger 900.

Air discharger 900 includes a body 902 that extends along a longitudinal axis 904. Discharger 900 includes an optional nozzle 908 that discharges air from a proximal air inlet 909 through discharger 900 and out a distal opening 910. Nozzle 910 can be omitted while still allowing discharger 900 to operate. Additionally, different nozzles can be used depending on user preferences.

Figure 9C:
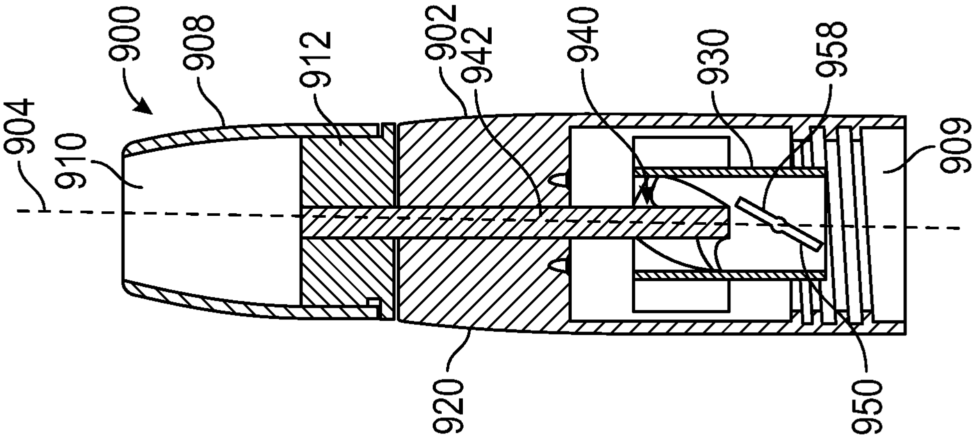
FIG. 9C is a sectional view of the air generator of FIG. 9B taken along line 9C-9C of FIG. 9B.
Figure 9D:
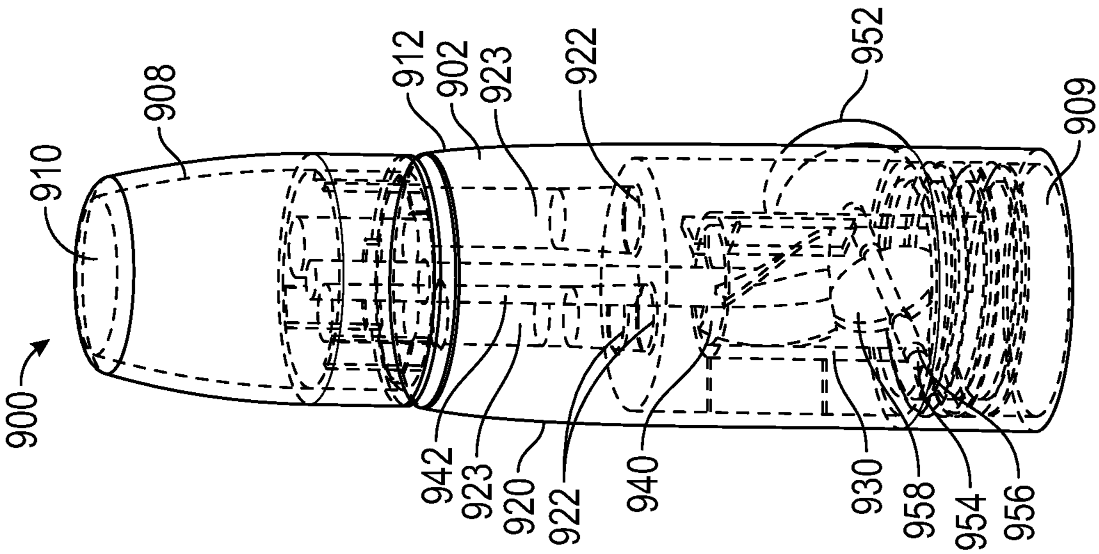
FIG. 9D is a perspective view of the interior of the air generator of FIG. 9A.
Figure 9E:
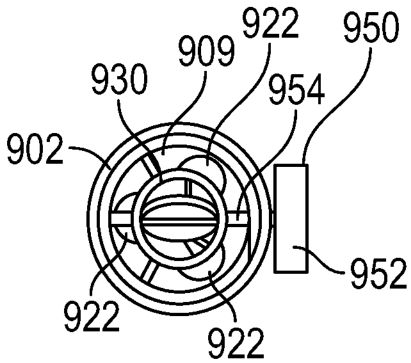
FIG. 9E is a bottom plan view of the air generator of FIG. 9A.
Figure 9F:
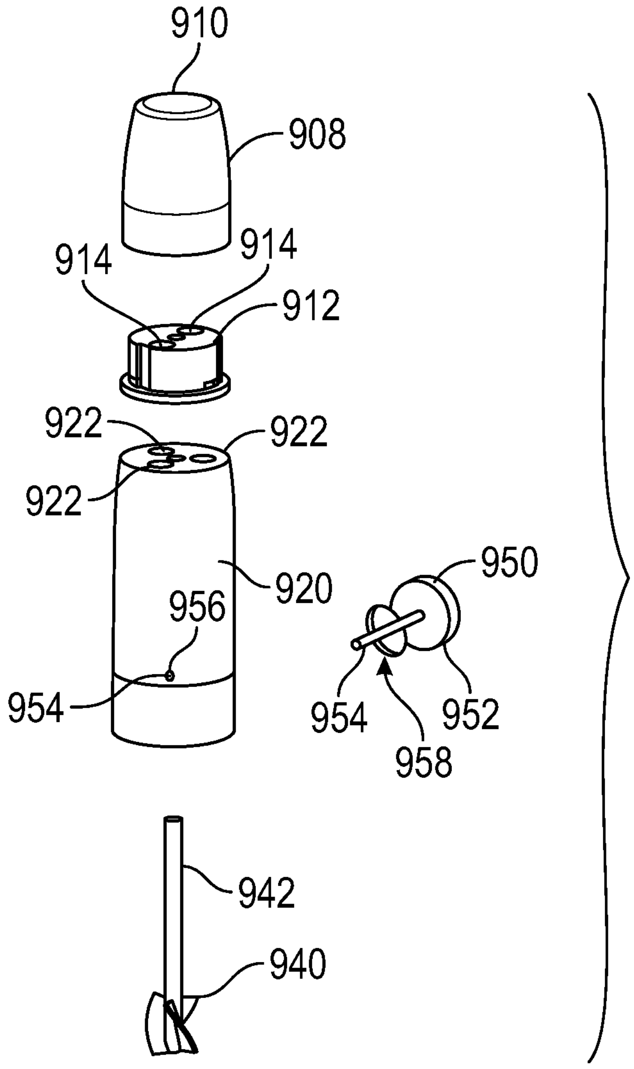
FIG. 9F is an exploded view of the air generator of FIG. 9A.

Nozzle 908 is attached to a rotating aperture disk 912. Disk 912 has a first number of apertures 914 formed therein. In an exemplary embodiment, as shown in FIG. 9F, two apertures 914 are provided. Disk 912 is rotatingly mounted on shaft 942 of air turbine 940.

A stator body 920 located vertically below disk 912 has a second number of apertures 922 formed therein, different from the first number of apertures 914. In the embodiment shown in FIG. 9F, three apertures 922 are shown, although those skilled in the art will recognize that more or less than two apertures 914 and more or less than three apertures 922 can be provided, although it is desired that the first number of apertures 914 is not the same value as the second number of apertures 922. This unequal amount of apertures 914, 922 results in a pulsing air effect as air flows first through the fixed apertures 922 in stator body 920 and then through the apertures 914 as disk 912 rotates with axle 942.

Air turbine 940 is mounted below stator body 920 in a sleeve 930. Sleeve 930 directs air from air inlet 909 across turbine 940, rotating turbine 940 and shaft 942, along with rotator disk 912, due to the fixed attachment of rotator disk 912 to shaft 942, thereby generating the desired pulsing air effect from nozzle 910. Referring to FIG. 9D, a plurality of through passages 923 in stator body 920 allow air flow from air turbine 940 to opening 910 for discharge.

To regulate the amount of air flowing across turbine 940 and the resulting pulsing effect, a butterfly valve 950 is provided upstream of air turbine 940. Butterfly valve 950 includes a knob 952 extending outside of body 902. Knob 952 is attached to a shaft 954 that extends across sleeve 930 and is supported on a distal side of knob 952 by a slot 956 in body 902. A circular flapper 958 is mounted on shaft 954. Flapper 958 can be rotated within sleeve 930 by rotating knob 952 to allow infinite air flow regulation between full flow when flapper 958 is aligned with longitudinal axis 904 and no flow when flapper 958 is perpendicular to longitudinal axis 904 and blocking the interior of sleeve 930.

In an exemplary embodiment, for continuous air massage (no pulsing), it is desired that a 0.86 inches diameter nozzle outputs air at about 282 miles per hour (mph) and 100 cubic feet per minute (CFM); a 0.62 inches diameter nozzle outputs air at 387 mph and 74 CFM; and a 0.43 inches diameter nozzle outputs air at 457 mph and 40 CFM.

In an alternative exemplary embodiment, for pulsing air massage, it is desired that a ⅜" diameter nozzle outputs air at about 450 mph and about 30 CFM.

Further, other features can be added to the above described devices to decrease the noise level of the operating devices, to decrease vibration-induced resonance-related noise, and to cool the operating motor by conducting heat away from the blower motor.

By way of example only, an internal muffler tube such as from pdblowers of Gainesville, GA or a SOLBERG Regenerative blower from Grainger can be used to muffle the sound of the blower motor.

Also, by way of example only, motor cooling can be achieved by using a water cooling jacket as well as other known heat dissipation devices, such as heat sinks.

It will be further understood that various changes in the details, materials, and arrangements of the parts which have been described and illustrated in order to explain the nature of this invention may be made by those skilled in the art without departing from the scope of the invention as expressed in the following claims.

We claim:

1. An air massager comprising:

an air flow generator having an output;

and a pulsed air generator located downstream of the output, wherein operation of the pulsed air generator alternately allows and restricts air flow from the massager, wherein the pulsed air generator comprises a rotor having a first rotor aperture and a remainder of rotor apertures, the first rotor aperture and the remainder of rotor apertures being all of the rotor apertures and a stator plate located vertically below the rotor, the stator plate having a first stator aperture and a remainder of stator apertures, the first stator aperture and the remainder of stator apertures being all of the stator apertures, wherein when the rotor rotates, when the first rotor aperture is aligned with the first stator aperture, none of the remainder of rotor apertures are aligned with any of the remainder of stator apertures, generating air pulses.

2. The air massager according to claim 1, wherein the pulsed air generator is adjustable such that adjusting the pulsed air generator adjusts a time period between pulses.

3. The air massager according to claim 1, wherein the air flow generator is placed on one of a table and a floor.

4. The air massager according to claim 1, wherein the air flow generator generates air flow greater than 200 miles per hour.

5. The air massager according to claim 1, wherein the air flow generator generates air flow rate greater than 30 cubic feet per minute.

6. The air massager according to claim 1, wherein the pulsed air generator comprises a rotating wheel.

7. The air massager according to claim 1, wherein the rotor is motor operated.

8. The air massager according to claim 1, further comprising a nozzle downstream of the pulsed air generator.

9. A method of massaging a body part comprising the steps of:

(a) providing the air massager according to claim 8;

(b) selecting a body part to be massaged;

(c) aiming the nozzle at the selected body part;

(d) generating a pulsed air flow from the air flow generator, through the nozzle, and to the body part.

10. The method according to claim 9, further comprising the step of:

(e) adjusting a time period between pulses generated in step (d).

11. The method according to claim 9, wherein step (d) comprises generating an air flow of greater than 200 miles per hour.

12. The method according to claim 9, wherein step (d) comprises generating an air flow rate of greater than 30 cubic feet per minute.

* * * * *